(12) United States Patent
Zhang et al.

(10) Patent No.: US 12,489,510 B2
(45) Date of Patent: Dec. 2, 2025

(54) BEAM FAILURE DETECTION

(71) Applicant: Apple Inc., Cupertino, CA (US)

(72) Inventors: Yushu Zhang, Beijing (CN); Wei Zeng, San Diego, CA (US); Dawei Zhang, Saratoga, CA (US); Haijing Hu, Beijing (CN); Haitong Sun, Irvine, CA (US); Weidong Yang, San Diego, CA (US); Yuchul Kim, Santa Clara, CA (US); Hong He, Cupertino, CA (US); Oghenekome Oteri, San Diego, CA (US); Chunxuan Ye, San Diego, CA (US); Chunhai Yao, Beijing (CN); Jie Cui, San Jose, CA (US); Yang Tang, Cupertino, CA (US); Yakun Sun, San Jose, CA (US)

(73) Assignee: Apple Inc., Cupertino, CA (US)

( * ) Notice: Subject to any disclaimer, the term of this patent is extended or adjusted under 35 U.S.C. 154(b) by 287 days.

(21) Appl. No.: 17/437,889

(22) PCT Filed: Oct. 22, 2020

(86) PCT No.: PCT/CN2020/122748
§ 371 (c)(1),
(2) Date: Sep. 10, 2021

(87) PCT Pub. No.: WO2022/082580
PCT Pub. Date: Apr. 28, 2022

(65) Prior Publication Data
US 2022/0302985 A1    Sep. 22, 2022

(51) Int. Cl.
*H04B 7/06*    (2006.01)
*H04L 5/00*    (2006.01)
(Continued)

(52) U.S. Cl.
CPC ....... *H04B 7/06964* (2023.05); *H04L 5/0051* (2013.01); *H04W 24/10* (2013.01); *H04W 76/19* (2018.02)

(58) Field of Classification Search
CPC ..... H04W 76/18; H04W 76/19; H04W 24/08; H04W 24/10; H04W 72/02;
(Continued)

(56) References Cited

U.S. PATENT DOCUMENTS 10,841,149 B2 * 11/2020 Nagaraja ............... H04L 5/0051
2019/0173740 A1 * 6/2019 Zhang ................. H04L 41/0677
(Continued)

FOREIGN PATENT DOCUMENTS

CN    109803275 A    5/2019
CN    111278023      6/2020
(Continued)

OTHER PUBLICATIONS

International Search Report for PCT Patent Application No. PCT/CN2020/122748; mailed Jul. 12, 2021.
Office Action for CN No. 202080106524.2; Dec. 23, 2024.

*Primary Examiner* — Huy D Vu
*Assistant Examiner* — Scott A Schlack
(74) *Attorney, Agent, or Firm* — Kowert, Hood, Munyon, Rankin & Goetzel, P.C.

(57) ABSTRACT

Embodiments are presented herein of apparatuses, systems, and methods for a user equipment device (UE) to perform beam failure detection. The UE may establish communication with a base station. The UE may determine one or more beams to perform downlink communication from the base station. The UE may receive, from the base station, an indication of a first type of downlink reference signals to perform beam failure detection. The UE may perform signal quality measurements for the one or more beams using the (Continued)

first type of downlink reference signals. The UE may determine beam failure of at least one beam of the one or more beams based on said performing signal quality measurements.

18 Claims, 12 Drawing Sheets

(51) Int. Cl.
*H04W 24/10* (2009.01)
*H04W 76/19* (2018.01)

(58) Field of Classification Search
CPC ........... H04W 72/044; H04W 72/0446; H04W 72/0453; H04B 7/0639; H04B 7/0695; H04B 7/06964; H04B 7/06966; H04B 7/06968; H04B 7/088; H04L 5/001; H04L 5/0048; H04L 5/0051; H04L 5/0098; H04L 41/0668; H04L 41/0677
See application file for complete search history.

(56) References Cited

U.S. PATENT DOCUMENTS

| | | |
|---|---|---|
| 2019/0215820 A1 | 7/2019 | Cirik et al. |
| 2019/0319833 A1 | 10/2019 | Nagaraja |
| 2021/0067306 A1* | 3/2021 | Ryu ....................... H04L 5/0023 |
| 2021/0105765 A1* | 4/2021 | Cirik ..................... H04W 76/18 |
| 2022/0103232 A1* | 3/2022 | Zhou .................... H04W 72/046 |
| 2022/0240238 A1* | 7/2022 | Rahman ................. H04B 7/088 |
| 2022/0264324 A1* | 8/2022 | Guo ................... H04W 74/0841 |
| 2023/0025072 A1* | 1/2023 | Yuan ..................... H04W 72/23 |
| 2023/0276278 A1* | 8/2023 | Loehr ............... H04W 74/0833 |
| | | 370/329 |

FOREIGN PATENT DOCUMENTS

| | | |
|---|---|---|
| CN | 111543024 | 8/2020 |
| WO | 2018174806 A1 | 9/2018 |
| WO | 2019215389 | 11/2019 |
| WO | 2020146400 A1 | 7/2020 |

* cited by examiner

BEAM FAILURE DETECTION

PRIORITY CLAIM INFORMATION

This application is a national stage application of International Application No. PCT/CN2020/122748, filed on Oct. 22, 2020, titled "Beam Failure Detection", which is hereby incorporated by reference in its entirety.

TECHNICAL FIELD

The present application relates to wireless devices, and more particularly to apparatuses, systems, and methods for acquiring on demand system information.

DESCRIPTION OF THE RELATED ART

Wireless communication systems are rapidly growing in usage. Wireless devices, particularly wireless user equipment devices (UEs), have become widespread. Additionally, there are a variety of applications (or apps) hosted on UEs that perform or depend on wireless communication, such as applications that provide messaging, email, browsing, video streaming, short video, voice streaming, real-time gaming, or various other online services. Increased reliability in these communication systems are desirable.

SUMMARY

Embodiments are presented herein of apparatuses, systems, and methods for a user equipment device (UE) to perform beam failure detection. The UE may establish communication with a base station. The UE may determine one or more beams to perform downlink communication from the base station. The UE may receive, from the base station, an indication of a first type of downlink reference signals to perform beam failure detection. The UE may perform signal quality measurements for the one or more beams using the first type of downlink reference signals. The UE may determine beam failure of at least one beam of the one or more beams based on said performing signal quality measurements.

In some embodiments, a non-transitory memory medium may include program instructions executable by a UE that, when executed, cause the UE to perform at least a portion or all of the above operations. In some embodiments, a method performed by the UE may include the UE performing the above operations. In some embodiments, a method performed by a base station or network element may include the base station or network element performing corresponding operations.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the disclosed embodiments can be obtained when the following detailed description is considered in conjunction with the following drawings, in which.

Figure 1:
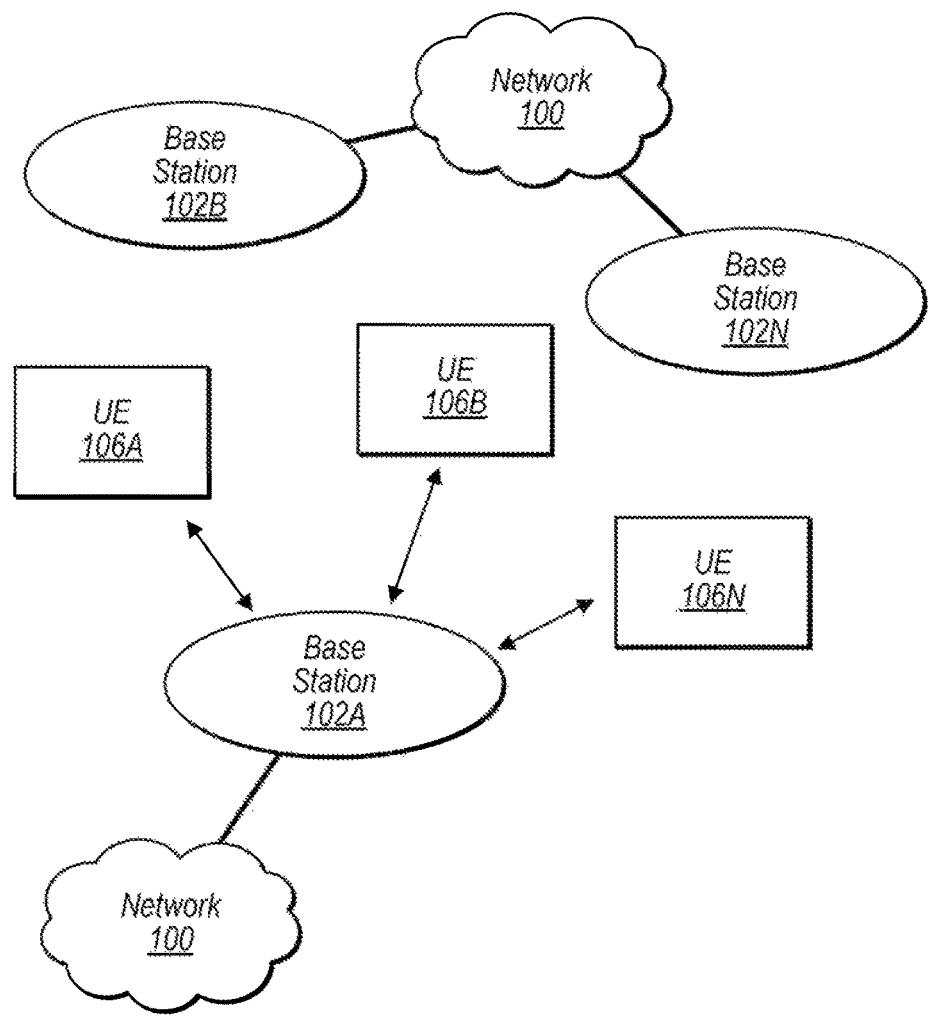
FIG. 1 illustrates an example wireless communication system, according to some embodiments.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms are used in the present Patent Application:

UE: User Equipment
BS: Base Station
ENB: eNodeB (Base Station)
LTE: Long Term Evolution
UMTS: Universal Mobile Telecommunications System
RAT: Radio Access Technology
RAN: Radio Access Network
E-UTRAN: Evolved UMTS Terrestrial RAN
CN: Core Network
EPC: Evolved Packet Core
MME: Mobile Management Entity
HSS: Home Subscriber Server
SGW: Serving Gateway
PS: Packet-Switched
CS: Circuit-Switched
EPS: Evolved Packet-Switched System
RRC: Radio Resource Control
IE: Information Element
QoS: Quality of Service
QoE: Quality of Experience
TFT: Traffic Flow Template
RSVP: Resource ReSerVation Protocol
API: Application programming interface

Terms

The following is a glossary of terms used in the present application:

Memory Medium—Any of various types of memory devices or storage devices. The term "memory medium" is intended to include an installation medium, e.g., a CD-ROM, floppy disks 104, or tape device: a computer system memory or random access memory such as DRAM, DDR RAM, SRAM, EDO RAM, Rambus RAM, etc.: a non-volatile memory such as a Flash, magnetic media, e.g., a hard drive, or optical storage: registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™. Samsung Galaxy™), portable gaming devices (e.g., Nintendo DS™. PlayStation Portable™, Gameboy Advance™, iPhone™), wearable devices (e.g., smart watch, smart glasses), laptops, PDAs, portable Internet devices, music players, data storage devices, other handheld devices, automobiles and/or motor vehicles, unmanned aerial vehicles (UAVs) (e.g., drones), UAV controllers (UACs), etc. In general, the term "UE" or "UE device" can be broadly defined to encompass any electronic, computing, and/or telecommunications device (or combination of devices) which is easily transported by a user and capable of wireless communication.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Figure 2:
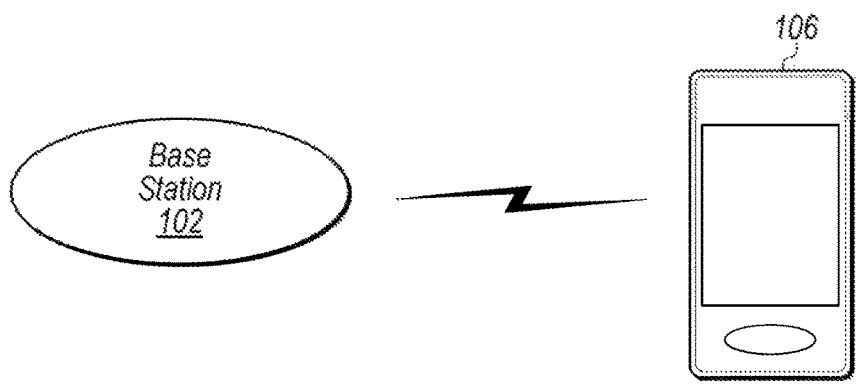
FIG. 2 illustrates a base station (BS) in communication with a user equipment (UE) device, according to some embodiments.

FIGS. 1 and 2—Communication System

FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102 which communicates over a transmission medium with one or more user devices 106A, 106B, etc., through 106N. Each of the user devices may be referred to herein as a "user equipment" (UE).

Thus, the user devices 106 are referred to as UEs or UE devices.

The base station (BS) 102 may be a base transceiver station (BTS) or cell site (a "cellular base station"), and may include hardware that enables wireless communication with the UEs 106A through 106N.

The communication area (or coverage area) of the base station may be referred to as a "cell." The base station 102 and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), 6G, HSPA, 3GPP2 CDMA2000 (e.g., 1×RTT, 1×EV-DO, HRPD, eHRPD), etc. Note that if the base station 102 is implemented in the context of LTE, it may alternately be referred to as an 'eNodeB' or 'eNB'. Note that if the base station 102 is implemented in the context of 5G NR, it may alternately be referred to as 'gNodeB' or 'gNB'.

As shown, the base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. In particular, the cellular base station 102 may provide UEs 106 with various telecommunication capabilities, such as voice, SMS and/or data services.

Base station 102 and other similar base stations operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations 102B-N), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

In some embodiments, base station 102 may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1xEV-DO/HRPD/eHRPD) or LTE using a single shared radio and/or GSM or LTE using the single shared radio. The shared radio may couple to a single antenna, or may couple to multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams). To receive and/or transmit such directional signals, the antennas of the UE 106 and/or BS 102 may be configured to apply different "weight" to different antennas. The process of applying these different weights may be referred to as "precoding".

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTTor LTE or GSM), and separate radios for communicating using each of Wi-Fi and Bluetooth. Other configurations are also possible.

Figure 3:
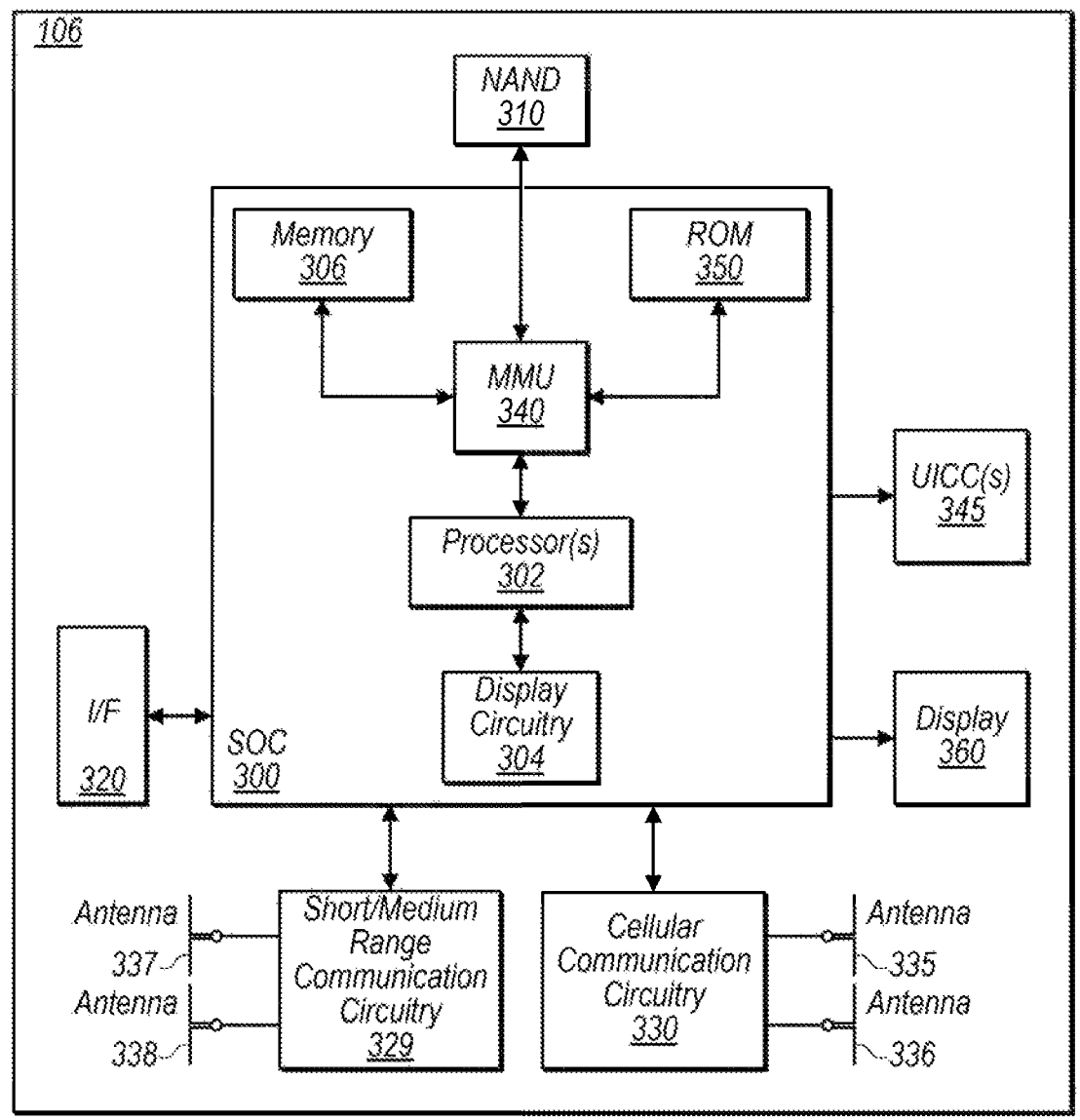
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively: directly or indirectly) to various other circuits of the communication device 106.

For example, the communication device 106 may include various types of memory (e.g., including NAND flash 310), an input/output interface such as connector I/F 320 (e.g., for connecting to a computer system: dock: charging station: input devices, such as a microphone, camera, keyboard: output devices, such as speakers: etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively: directly or indirectly) to one or more antennas, such as antennas 335 and 336 as shown. The short to medium range wireless communication circuitry 329 may also couple (e.g., communicatively: directly or indirectly) to one or more antennas, such as antennas 337 and 338 as shown. Alternatively, the short to medium range wireless communication circuitry 329 may couple (e.g., communicatively: directly or indirectly) to the antennas 335 and 336 in addition to, or instead of, coupling (e.g., communicatively: directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity (DC) with the first and second network nodes has been established.

As described herein, the communication device 106 may include hardware and software components for implementing features for using multiplexing to perform transmissions according to multiple radio access technologies in the same frequency carrier (e.g., and/or multiple frequency carriers), as well as the various other techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements and/or processors. In other words, one or more processing elements or processors may be included in cellular communication circuitry 330 and, similarly, one or more processing elements or processors may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 330. Similarly, the short range wireless communication circuitry 329 may include one or more ICs that are configured to perform the functions of short range wireless communication circuitry 329. In addition, each integrated circuit may include circuitry (e.g., first circuitry, second circuitry, etc.) configured to perform the functions of short range wireless communication circuitry 329.

Figure 4:
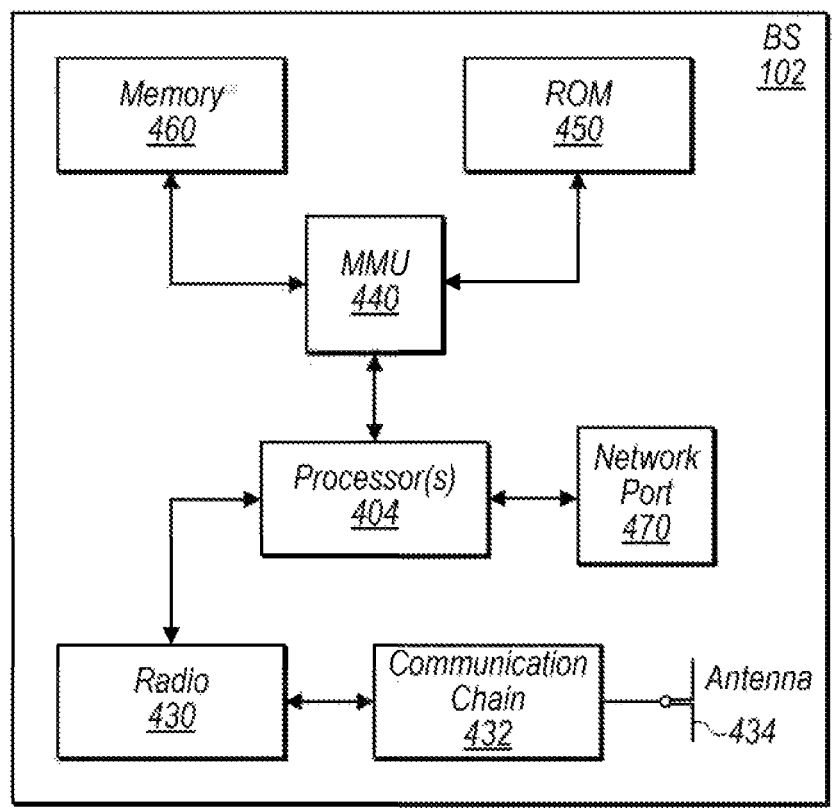
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The radio 430) and at least one antenna 434 may be configured to operate as a wireless transceiver and may be further configured to communicate with UE devices 106. The antenna 434 may communicate with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
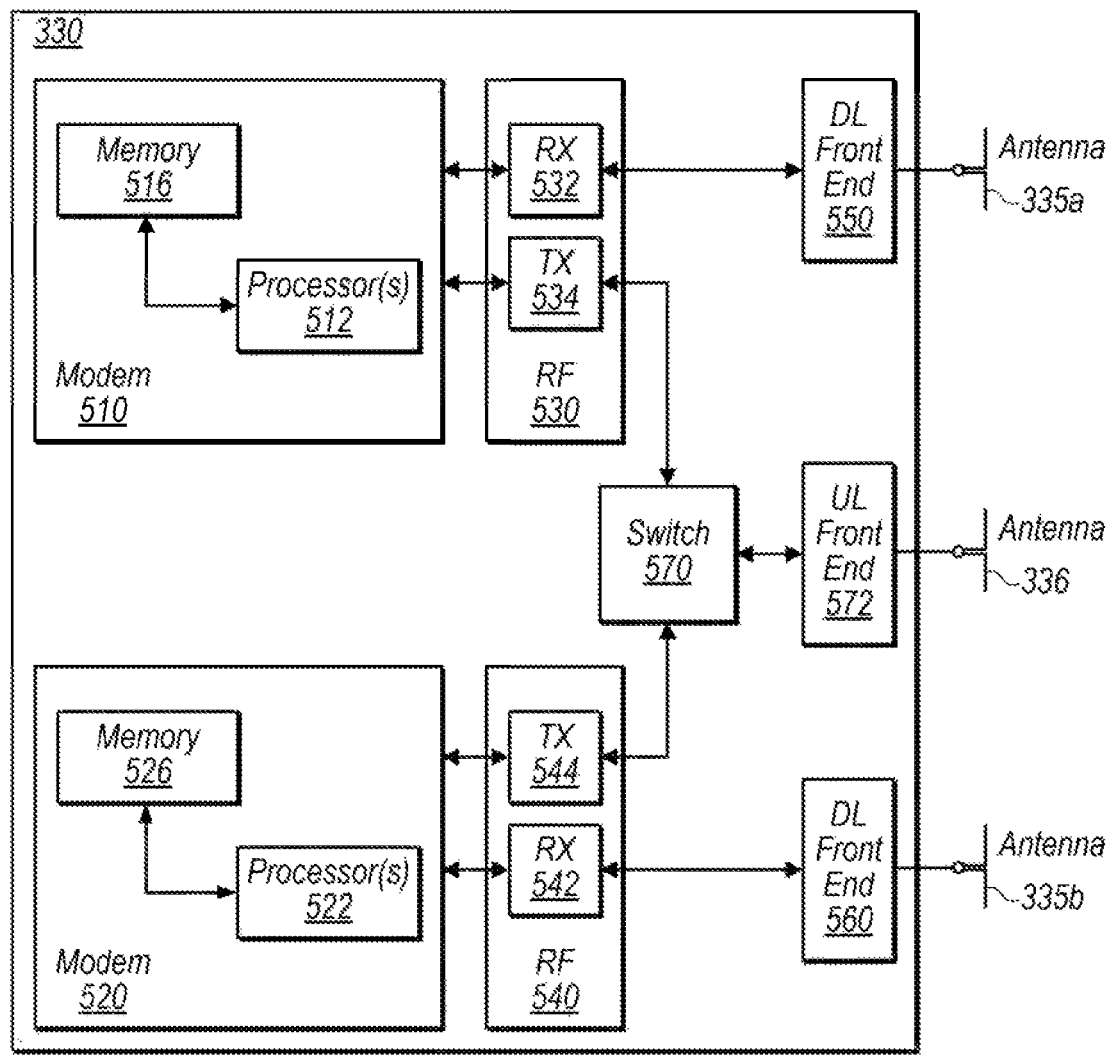
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, are also possible. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively: directly or indirectly) to one or more antennas, such as antennas 335*a-b* and 336 as shown (in FIG. 3). In some embodiments, cellular communication circuitry 330 may include dedicated receive chains (including and/or coupled to, e.g., communicatively, directly or indirectly, dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540) may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to transmit, via the first modem while the switch is in the first state, a request to attach to a first network node operating according to the first RAT and transmit, via the first modem while the switch is in a first state, an indication that the wireless device is capable of maintaining substantially concurrent connections with the first network node and a second network node that operates according to the second RAT. The wireless device may also be configured transmit, via the second radio while the switch is in a second state, a request to attach to the second network node. The request may include an indication that the wireless device is capable of maintaining substantially concurrent connections with the first and second network nodes. Further, the wireless device may be configured to receive, via the first radio, an indication that dual connectivity with the first and second network nodes has been established.

As described herein, the modem 510 may include hardware and software components for implementing features for using multiplexing to perform transmissions according to multiple radio access technologies in the same frequency carrier, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In some embodiments, processor(s) 512, 522, etc. may be configured to implement or support implementation of part or all of the methods described herein, e.g., by executing program instructions stored on a memory medium (e.g., a non-transitory computer-readable memory medium). Alternatively, the processor(s) 512, 522, etc. may be configured as a programmable hardware element, such as an FPGA, or as an ASIC, or a combination thereof. In addition, as described herein, processor(s) 512, 522, etc. may include one or more processing elements. Thus, processor(s) 512, 522, etc. may include one or more integrated circuits (ICs) that are configured to perform the functions of processor(s) 512, 522, etc. In addition, each integrated circuit may include circuitry (e.g., first circuitry, second circuitry, etc.) configured to perform the functions of processor(s) 512, 522, etc.

As described herein, the modem 520 may include hardware and software components for implementing features for using multiplexing to perform transmissions according to multiple radio access technologies in the same frequency carrier, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

Figure 6:
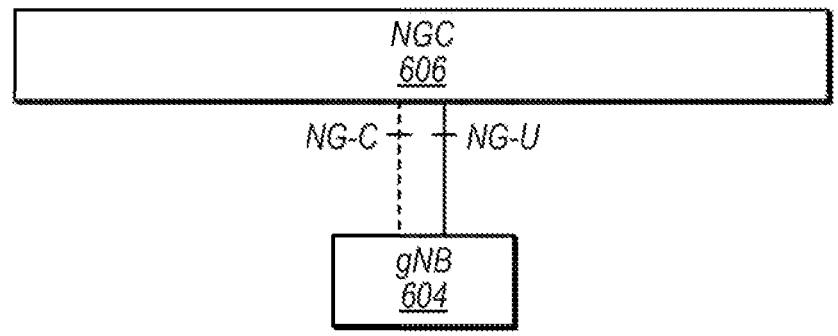
FIGS. 6 and 7 illustrate examples of a 5G NR base station (gNB), according to some embodiments.
Figure 7:
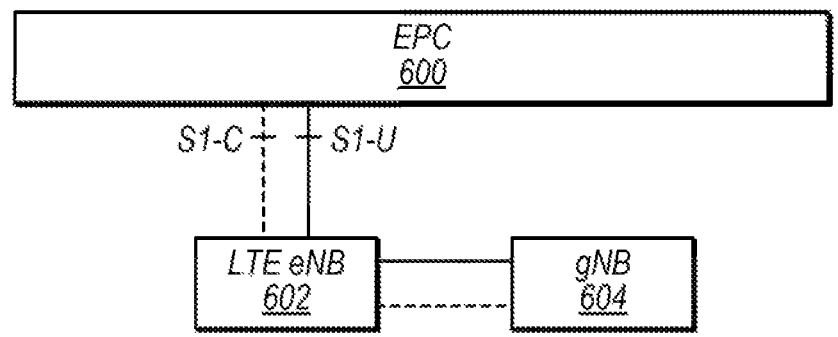

FIGS. 6-7—5G NR Architecture

In some implementations, fifth generation (5G) wireless communication will initially be deployed concurrently with other wireless communication standards (e.g., LTE). For example, whereas FIG. 6 illustrates a possible standalone (SA) implementation of a next generation core (NGC) network 606 and 5G NR base station (e.g., gNB 604), dual connectivity between LTE and 5G new radio (5G NR or NR), such as in accordance with the exemplary non-standalone (NSA) architecture illustrated in FIG. 7, has been specified as part of the initial deployment of NR. Thus, as illustrated in FIG. 7, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. In some instances, the gNB 604 may also have at least a user plane reference point with EPC network 600. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services. As will be appreciated, numerous other non-standalone architecture variants are possible.

Figure 8:
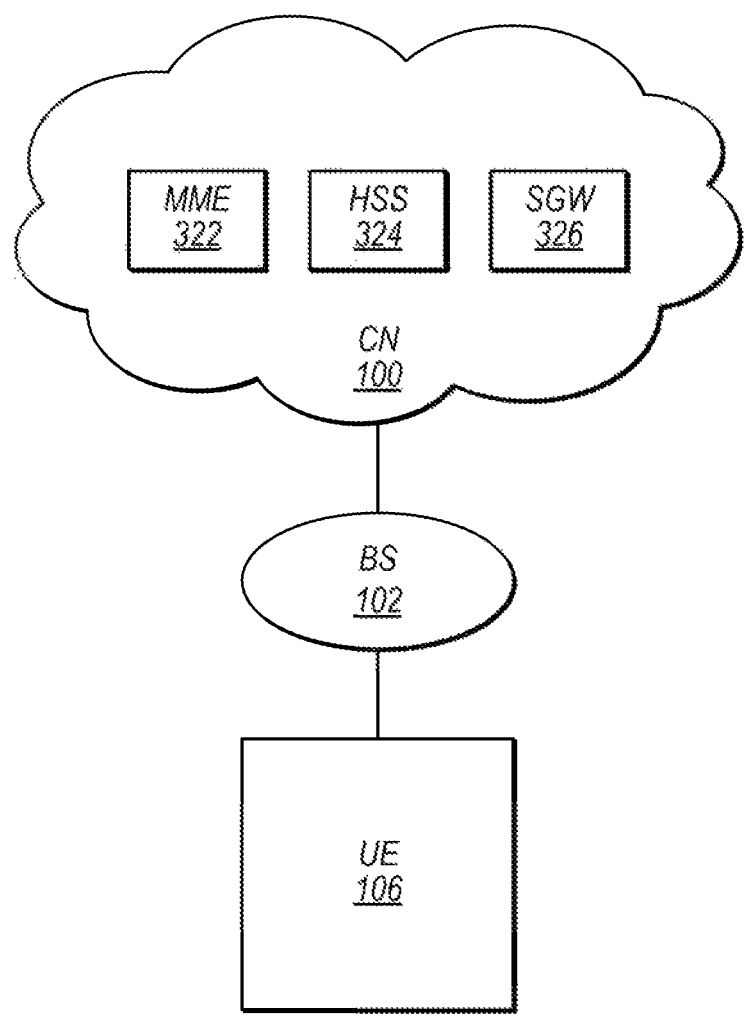
FIG. 8 illustrates an exemplary wireless network in communication with a UE, according to some embodiments.

FIG. 8—Wireless Communication System

FIG. 8 illustrates an example simplified portion of a wireless communication system. The UE 106 may be in communication with a wireless network, e.g., a radio access network (RAN), which may include one or more base stations (BS) 102 and may provide connection to a core network (CN) 100, such as an evolved packet core (EPC). The base station 102 may be an eNodeB and/or gNB (e.g., a 5G or NR base station) or other type of base station. The UE 106 may communicate in a wireless manner with the base station 102. In turn, the base station 102 may be coupled to a core network 100. As shown, the CN 100 may include a mobility management entity (MME) 322, a home subscriber server (HSS) 324, and a serving gateway (SGW) 326. The CN 100 may also include various other devices known to those skilled in the art.

Operations described herein as being performed by the wireless network may be performed by one or more of the network devices shown in FIG. 8, such as one or more of the base station 102 or the CN 100, and/or the MME 322, HSS 324, or SGW 326 in the CN 100, among other possible devices. Operations described herein as being performed by the radio access network (RAN) may be performed, for example, by the base station 102, or by other components of the RAN usable to connect the UE and the CN.

Figure 9:
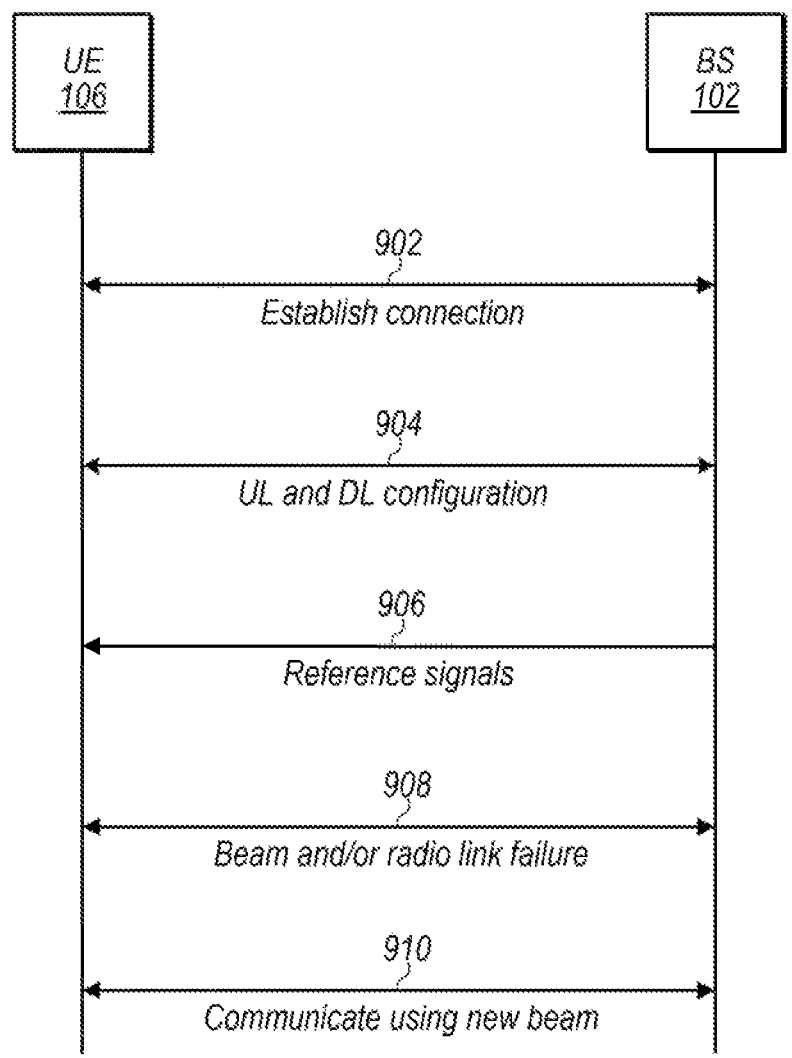
FIGS. 9-13 are flow chart diagrams illustrating example methods for beam failure detection, according to some embodiments.

FIG. 9—Beam Failure Detection and Radio Link Monitoring

FIG. 9 illustrates exemplary techniques for beam failure detection (BFD) and/or radio link monitoring (RLM). Aspects of the method of FIG. 9 may be implemented by a wireless device, such as the UE(s) 106, in communication with a network, e.g., via one or more base stations (e.g., BS 102) as illustrated in and described with respect to the Figures, or more generally in conjunction with any of the computer systems or devices shown in the Figures, among other circuitry, systems, devices, elements, or components shown in the Figures, among other devices, as desired. For example, one or more processors (or processing elements) of the UE (e.g., processor(s) 302, baseband processor(s), processor(s) associated with communication circuitry, etc., among various possibilities) may cause the UE to perform some or all of the illustrated method elements. Similarly, one or more processors (or processing elements) of the BS (e.g., processor(s) 404, baseband processor(s), processor(s) associated with communication circuitry, etc., among various possibilities) may cause the UE to perform some or all of the illustrated method elements. Note that while at least some elements of the method are described in a manner relating to the use of communication techniques and/or features associated with 3GPP specification documents, such description is not intended to be limiting to the disclosure, and aspects of the method may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

In 902, a UE (e.g., UE 106) may establish communication with a network (e.g., via base station 102), according to some embodiments. For example, the UE may perform an attach procedure with the base station. In some embodiments, the UE may provide capability information to the base station. For example, the UE may indicate various MIMO capabilities, number of available antennas, number of available ports, coherency (e.g., non-coherent, partial coherent, full coherent), etc.

In 904, the UE may determine uplink and downlink communication configurations for communicating with the network. For example, the UE may receive configuration information from the network, e.g., based on the UE capability information. The configuration information may be received in a single message or a plurality of messages and/or at a single time or over multiple different times, as desired. In some embodiments, at least a portion of the configuration information may be transmitted in radio resource control (RRC) signaling. The configuration information may specify the manner in which the UE performs communication with the base station, e.g., it may specify uplink and/or downlink configuration information for performing various uplink and/or downlink communication with the base station.

In some embodiments, the UE and the network may negotiate or determine (e.g., collaboratively) one or more beam configurations for performing uplink and/or downlink communication. For example, the base station and/or the UE may transmit reference signals (e.g., sounding reference signals) in various beams according to a known pattern/timing in order to allow the base station and UE to determine an appropriate beam configuration for performing uplink and/or downlink communication.

In some embodiments, the base station may specify one or more reference signals for use in performing beam failure detection and/or radio link monitoring. For example, the base station may indicate reference signals such as synchronization signal block (SSB), or channel state information reference signal (CSI-RS), etc. should be used by the UE to perform beam failure detection and/or radio link monitoring. In some embodiments, these reference signals may be distinguished herein by referring to them as different "types" of reference signals. For example, SSB may be referred to as a first type of reference signal(s) and CSI-RS may be referred to as a second type of reference signal(s).

The base station may indicate these reference signals (e.g., type of reference signals) by RRC signal, e.g., explicitly. However, the base station may not configure these reference signals for beam failure detection and/or radio link monitoring explicitly, but may do it implicitly. For example, the UE may be configured to determine an appropriate (e.g., type of) downlink reference signal to use for beam failure detection and/or radio link monitoring when there is no reference signal explicitly configured by RRC, which are described in various embodiments herein.

In 906, the UE may monitor reference signals to perform beam failure detection and/or radio link monitoring. For example, the UE may monitor reference signals such as synchronization signal block (SSB) and/or channel state information reference signal (CSI-RS), among other possibilities, such as position reference signals. In some embodiments, the reference signals may be for or generally associated with physical downlink control channel (PDCCH) reception. The UE may perform signal quality measurements based on the reference signals, such as a block error rate (BLER) although other signal quality metrics are also envisioned (e.g., SINR/SNR (signal to noise ratio), RSSI (received signal strength indicator), RSRP (reference signal received power), RSRQ (reference signal received quality), etc.).

In 908, the UE may determine a beam failure or generally perform radio link monitoring based on the signal quality metrics. For example, in some embodiments, if the signal quality is worse than a threshold (e.g., above a BLER threshold or below a signal quality threshold, among other possibilities), then beam failure may be determined. In some embodiments, rather than the signal quality being worse than the threshold a single time, beam failure may only be determined after consecutive signal quality measurements being worse than the threshold. In some embodiments the number of consecutive threshold failures may be configurable, e.g., based on messages or configurations transmitted by the base station. The number of thresholds may be configured as n. Thus, in some embodiments, beam failure may only be determined after n consecutive (or alternatively, n instances over a specified period of time) signal quality threshold failures.

In some embodiments, the UE may be configured to receive and/or transmit using a respective one or more beams. Radio link failure may be determined by the UE when a plurality or all of the configured receive and/or transmit beams have failed, e.g., as determined in 908. For example, if the UE is configured with a primary receive beam and a secondary receive beam, and the UE determines beam failure for both of the receive beams, it may accordingly determine radio link failure between the UE and the base station.

In 910, in response to beam failure and/or radio link failure, the UE may reestablish communication with the base station, e.g., using a new beam and/or by reestablishing a new radio link. For example, when only a single beam has failed, the UE may determine a new beam to use instead of the current beam, e.g., by using a secondary beam already determined between the UE and the base station and/or by determining a new beam to use with the base station. However, in the event of radio link failure, the UE may be determined to establish a new radio link with the base station, or hand over to a new base station and establish a new connection, as desired.

FIGS. 10-14

As noted above, the UE may monitor downlink reference signal(s) (e.g., periodically transmitted downlink reference signals), such as SSB or CSI-RS (among other possibilities). These reference signals may be used to determine link quality, e.g., for beam failure or radio link failure.

In some embodiments, these reference signals may be used to detect a hypothetical BLER for PDCCH reception. For example, if the UE detects the BLER is above a threshold for the downlink reference signals n consecutive times, the UE may determine beam failure or radio link failure accordingly.

As also noted above, the (e.g., type of) reference signals used for determining beam failure detection and/or radio link monitoring may be configured by the base station. In some embodiments, these reference signals may be configured via RRC signal, e.g., explicitly. Alternatively, or additionally, if there is no reference signal configured by RRC, the reference signal configured in the transmission configuration indicator (TCI) state of the Control Resource Set (CORESET) may be used. In some embodiments, the TCI state may indicate one or more reference signals. In some embodiments, the TCI state may indicate two different reference signals, e.g., CSI-RS and SSB. The TCI state may also indicate quasi-colocation (QCL) for these reference signals, e.g., QCL-TypeD and/or QCL-TypeA. QCL-TypeD may be used to indicate the spatial receive parameter (e.g., receive beam). QCL-TypeA may denote that two signals are QCLed with the same Doppler shift, Doppler spread, average delay, and/or delay spread. For example, if PDCCH is QCLed with CSI-RS with QCL-TypeA, then PDCCH and CSI-RS may be QCLed with the same Doppler shift, Doppler spread, average delay, and/or delay spread. In some embodiments, if there are two reference signals configured in a TCI state, the one having QCL-TypeD may be used for beam failure detection.

Figure 10:
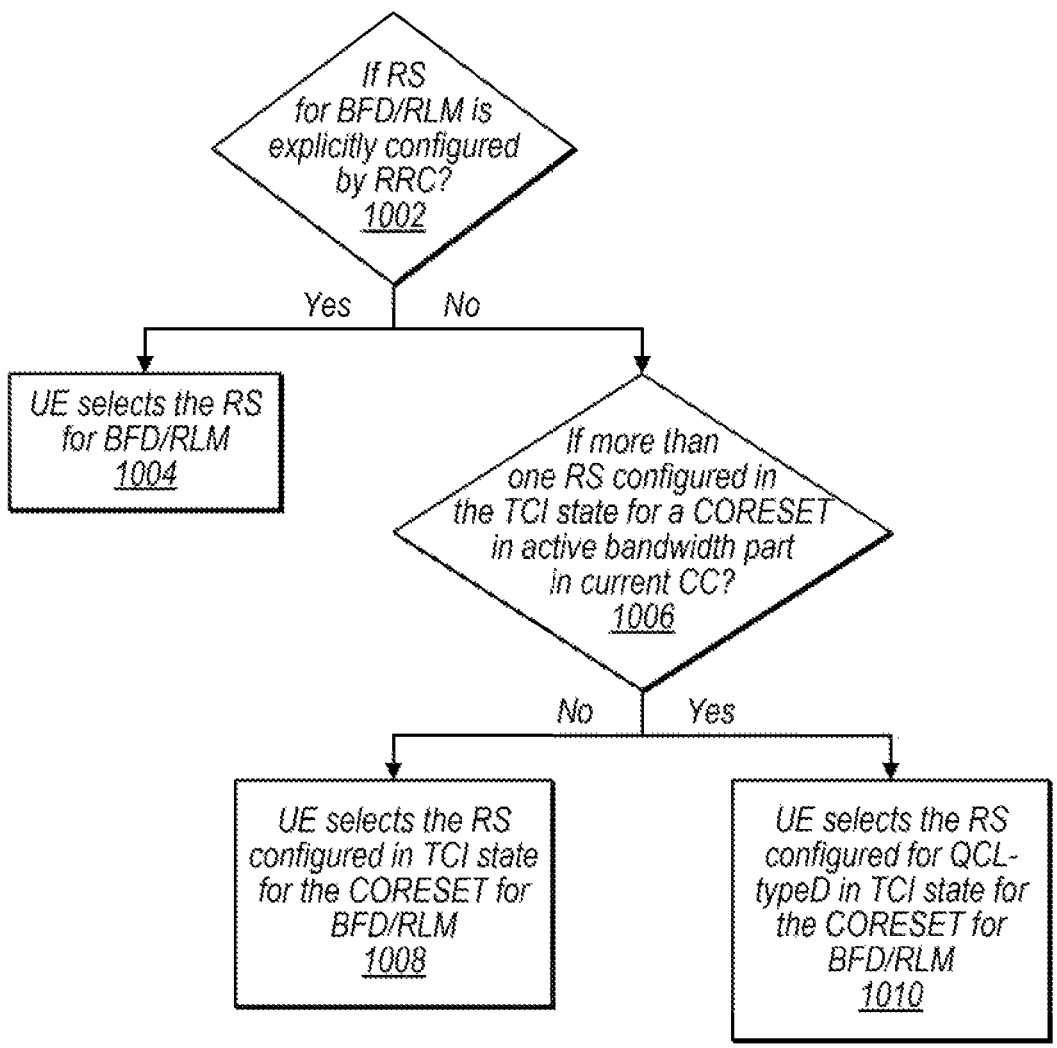

As shown in FIG. 10, the UE may determine the appropriate reference signal to for beam failure detection and/or radio link monitoring.

In 1002, if reference signal for beam failure detection and/or radio link monitoring is configured in RRC (e.g., explicitly), the UE may use the indicated reference signal (1004). However, if there are more than one reference signal configured in the TCI state, e.g., for a CORESET in the active bandwidth part (BWP) in current component carrier (CC) (1006), the UE may select the reference signal configured for QCL-TypeD in the TCI state for the CORESET (1010). However, if there is not more than one reference signal configured in the TCI state, the UE may select that reference signal (1008).

In some embodiments, the UE may declare beam failure or radio link failure when all the CORESETs fail, e.g., the BLER for the corresponding RSs is above a threshold, e.g., n consecutive times.

In some embodiments, e.g., to streamline the uplink and downlink beam management, it may be possible to introduce sounding reference signal (SRS) indication(s) in the TCI state. However, SRS may or may not be allowed to be indicated in the TCI state for a CORESET. Additionally, if SRS is indicated in the TCI state for a CORESET, and the base station has not configured RS for beam failure detection and/or radio link monitoring (e.g., via RRC signaling), then the UE may need to determine (e.g., implicitly) which downlink reference signals to use.

In some embodiments, the SRS may only be introduced in the TCI state for PDSCH and CSI-RS, but cannot be indicated in the TCI state for a CORESET. Alternatively, SRS may be allowed to be indicated in the TCI state for a CORESET when reference signals for beam failure detection and/or radio link monitoring is not configured.

As another option, SRS may be allowed to be indicated in the TCI state for a CORESET when reference signals for beam failure detection and/or radio link monitoring is configured (e.g., explicitly by the base station). In other words, when beam failure detection and/or radio link monitoring is configured, if SRS is indicated in the TCI state for a CORESET, the UE may expect that the base station configure the reference signal for beam failure detection and/or radio link monitoring, e.g., explicitly by RRC signaling.

In some embodiments, the UE may apply the same beam to receive PDCCH in the CORESET as the one used for the SRS transmission.

In some embodiments, when SRS is indicated in a TCI state, the base station may not indicate any other reference signals for QCL-typeD in the same TCI state.

Figure 11:
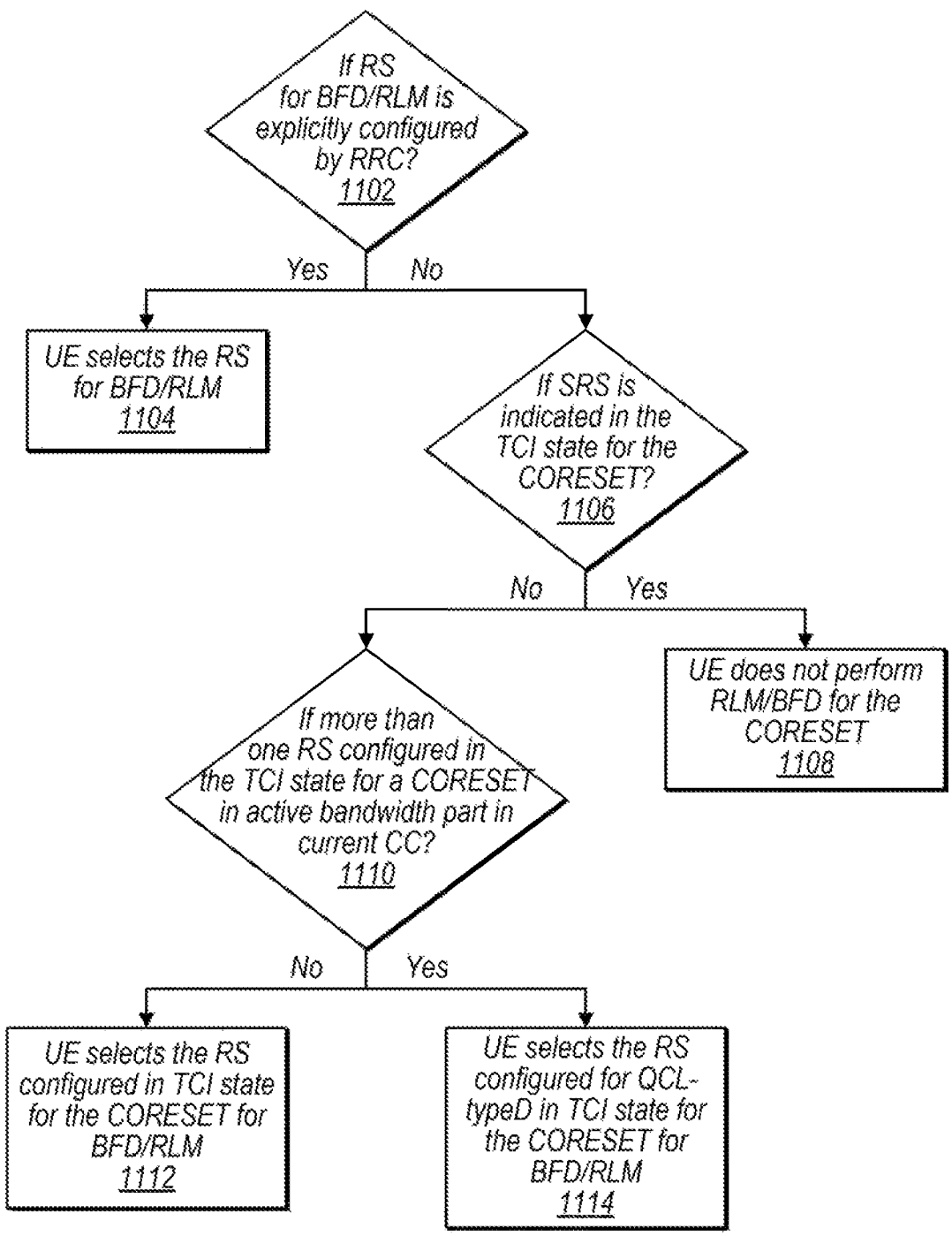

In the embodiment shown in FIG. 11, SRS may be indicated in TCI state for a CORESET. Similar to FIG. 10, if BFD/RLM reference signals are configured by RRC (1102), the UE may select the indicated reference signals (1104). However, if BFD/RLM is configured but no downlink reference signal for BFD/RLM is configured, e.g., explicitly, then the UE may not perform beam failure detection and/or radio link monitoring for the CORESET when SRS is indicated in its TCI state (1108). Alternatively, if SRS is not indicated in the TCI state for the CORESET (1106), then the flowchart may proceed in 1110/1112/1114 similar to 1006/1008/1010.

Figure 12:
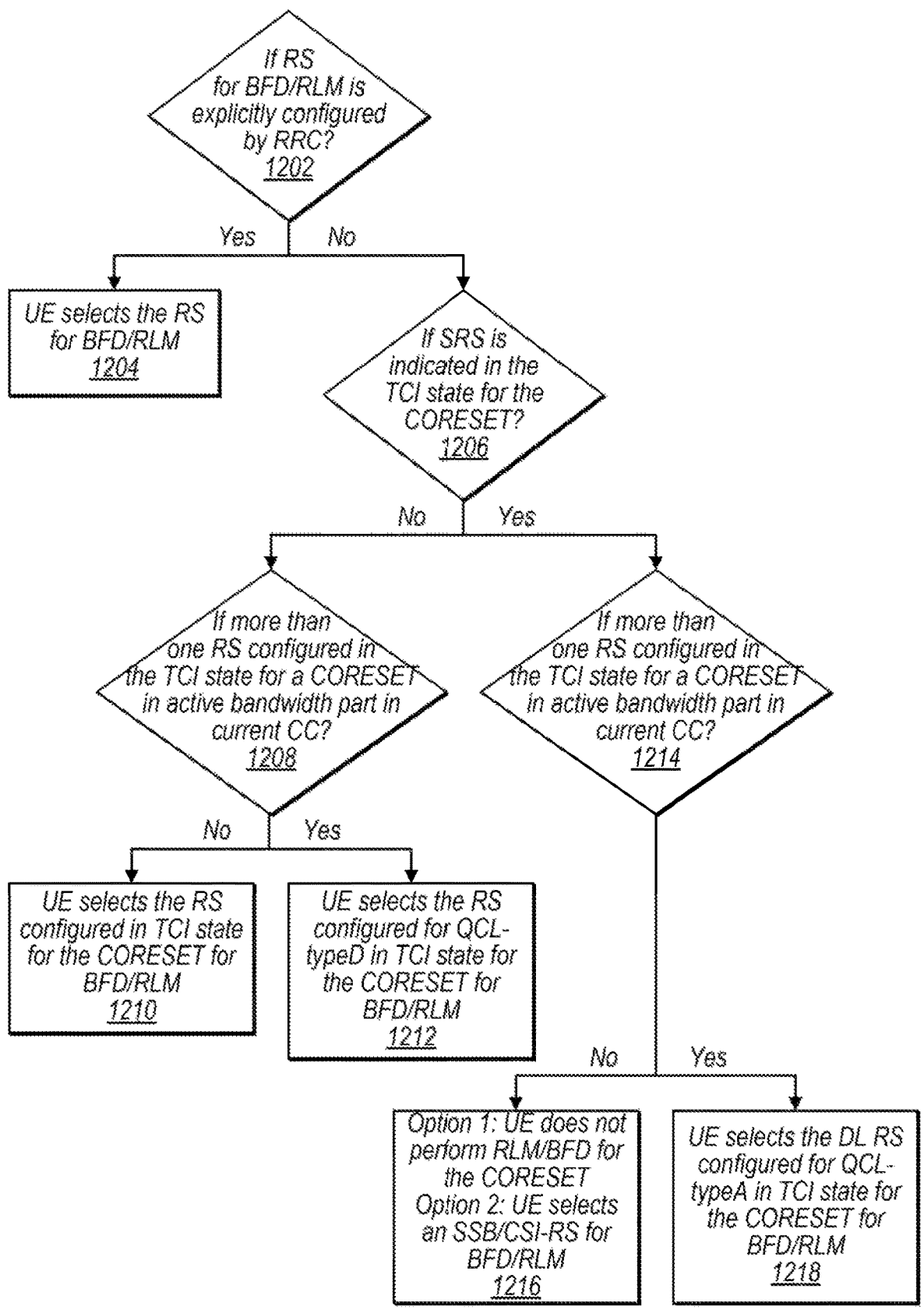

In the embodiment shown in FIG. 12, SRS may be indicated in TCI state for a CORESET. 1202/1204/1206/1208/1210/1212 may operate similar to 1102/1104/1106/1110/1112/1114. However, if the SRS is indicated in the TCI state for the CORESET (1204), then RS configuration in the TCI state may be handled different (1212). For example, if more than one RS is configured in the TCI state for a CORESET in the active BWP in current CC (1212), the UE may select the downlink reference signal in the TCI state for the CORESET configured for QCL type other than QCL-typeD, e.g., downlink reference signal for QCL-typeA (1216). As noted above, QCL-typeA may denote the two RS are QCLed with the same Doppler shift, Doppler spread, average delay, and/or delay spread.

However, if more than one RS is not configured in the TCI state for a CORESET in the active BWP in the current CC (1214), different options may be used, according to various embodiments. In option 1, if only SRS is configured in the TCI state for the CORESET, the UE may skip BFD/RLM for the CORESET. In option 2, if only SRS is configured in the TCI state for the CORESET, the UE can perform BFD/RLM based on an SSB/CSI-RS in the same bandwidth part as the CORESET. In one embodiment, the SSB used for initial access, e.g., associated with the Master Information Block (MIB) decoded by the UE, can be used. In some embodiments, the periodic CSI-RS with lowest resource ID may be used/selected. In some embodiments, the downlink reference signal (e.g., SSB and/or CSI-RS) used for the pathloss estimation for the SRS may be used.

Figure 13:
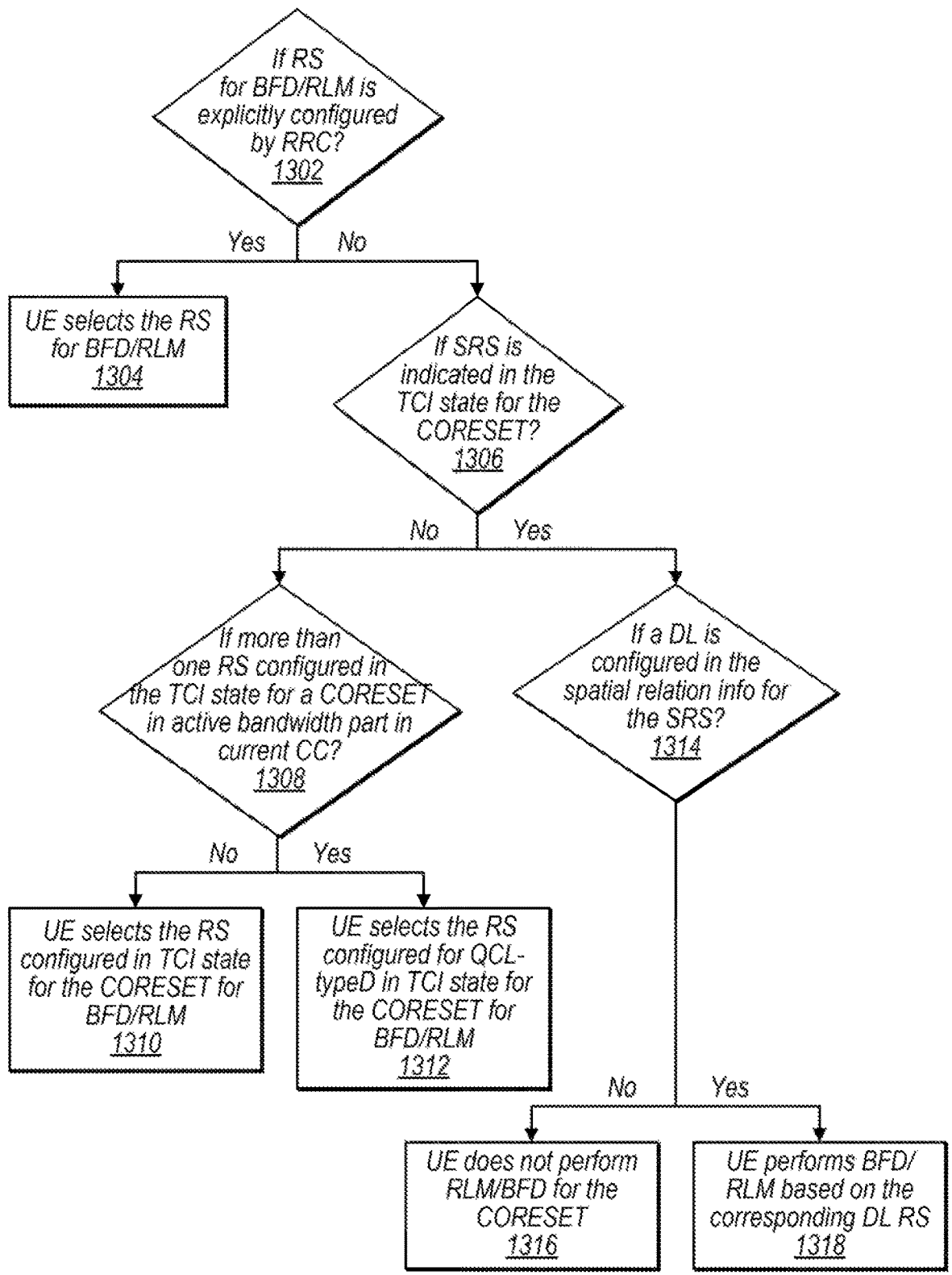

In the embodiment shown in FIG. 13, SRS may be indicated in TCI state for a CORESET. 1302/1304/1306/1308/1310/1312 may operate similar to 1202/1204/1206/1208/1210/1212. However, if BFD/RLM is configured and no downlink reference signal is configured, e.g., explicitly, the UE may use the downlink reference signals configured in the spatial relation info for the SRS to perform BFD/RLM (1318). However, if there is no downlink reference signal configured in the spatial relation info (1314), the UE may skip the BFD/RLM for the CORESET (1316). Alternatively, the embodiment of FIG. 12 may apply. For example, if there is no downlink reference signal configured in the special relation information for the SRS, 1216 may be applied. In some embodiments, the downlink reference signal may be a periodic reference signal, e.g., SSB or CSI-RS.

Figure 14:
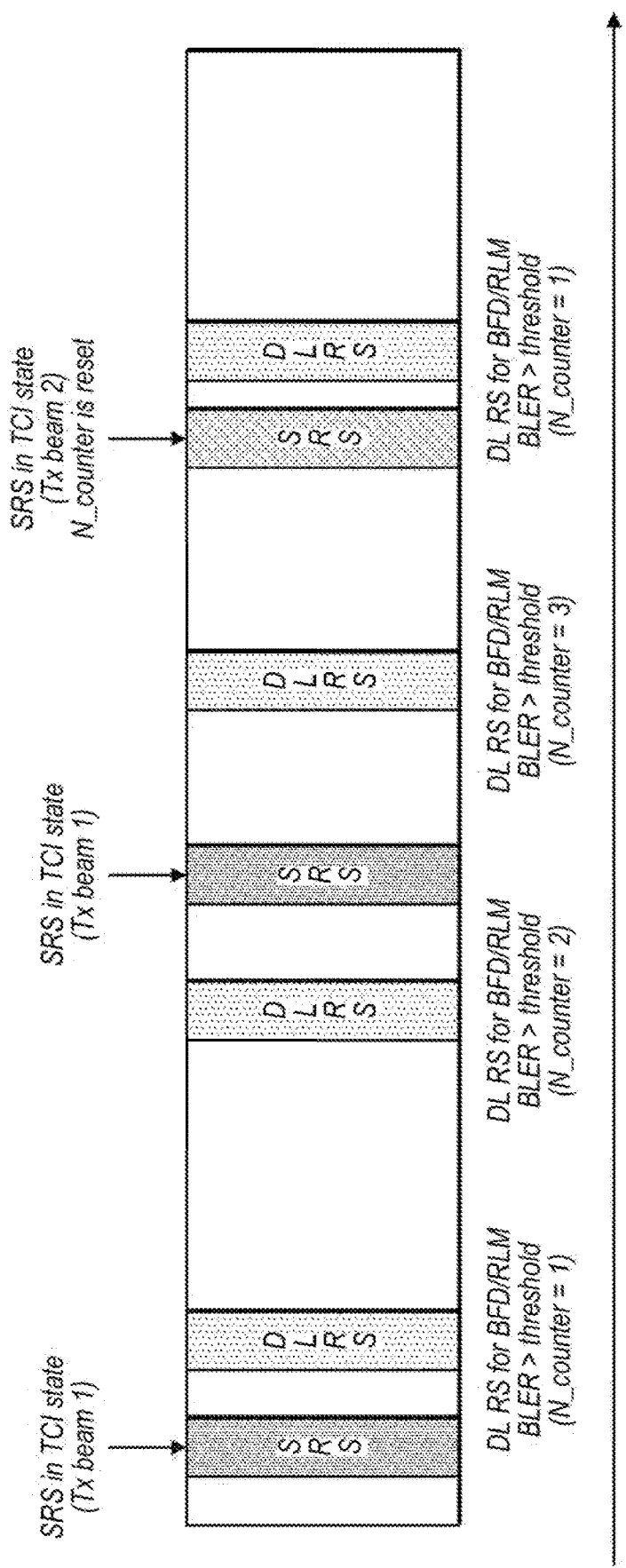
FIG. 14 is a timing diagram illustrating an example embodiment for using a counter for beam failure detection, according to some embodiments.

As shown in FIG. 14, if the UE performs BFD/RLM for the CORESET where SRS is configured in its TCI state, the counter for beam failure detection and radio link monitoring may be maintained based on the UE transmit beam for the corresponding SRS. In some embodiments, the counter may be reset if the UE changes the transmit beam (transmitting spatial domain filter) for the SRS. The counter may be used to determine number of consecutive beam failure and/or out-of-synch instances, e.g., for determining beam failure.

More specifically, as shown, there may be three downlink reference signal instances prior to SRS in TCI state changing from transmit beam 1 to transmit beam 2. Correspondingly, the counter may increase from 1 to 3 prior to the change and be reset to 1 after the change.

EXEMPLARY EMBODIMENTS

The following descriptions provide exemplary embodiments corresponding to various embodiments described herein, e.g., such as corresponding to the method of FIGS. 9-14.

Example 1. An apparatus, comprising: one or more processors, configured to cause a user equipment device (UE), to: establish communication with a base station: determine one or more beams to perform downlink communication from the base station; receive, from the base station, an indication of a first type of downlink reference signals to perform beam failure detection: perform signal quality measurements for the one or more beams using the first type of downlink reference signals; and determine beam failure of at least one beam of the one or more beams based on said performing signal quality measurements.

Example 2. The apparatus of example 1, wherein said determining beam failure is performed by comparing the signal quality measurements to a threshold.

Example 3. The apparatus of example 1, wherein said determining beam failure comprises, for n consecutive times: performing a respective signal quality measurement for a first beam; and comparing the respective signal quality measurement to a signal quality threshold: wherein beam failure is determined when the respective signal quality measurement falls below a signal quality threshold n consecutive times.

Example 4. The apparatus of example 1, wherein said receiving the indication of downlink reference signals comprises: receiving radio resource control (RRC) signaling explicitly indicating the first type of downlink reference signals.

Example 5. The apparatus of example 1, wherein the first type of downlink reference signals comprise synchronization signal block (SSB) or channel state information reference signal (CSI-RS).

Example 6. The apparatus of example 1, wherein said receiving the indication of the type of downlink reference signals comprises receiving a transmission configuration indicator (TCI): wherein the one or more processors are configured to: determine the type of downlink reference signals based on the TCI.

Example 7. The apparatus of example 6, wherein the TCI is associated with a control resource set (CORESET), wherein the TCI indicates a plurality of types of downlink reference signals, wherein said determining the type of downlink reference signals comprises selecting the first type of downlink reference signals from the plurality of types of downlink reference signals indicated in the TCI.

Example 8. The apparatus of example 6, wherein the TCI indicates a sounding reference signal (SRS), wherein said determining the type of downlink reference signals based on the TCI is based on the SRS being indicating in the TCI.

Example 9. The apparatus of example 8, wherein determining the type of downlink reference signals based on the TCI comprises selecting the type of downlink reference signals used in a same bandwidth part.

Example 10. A user equipment (UE), comprising: wireless communication circuitry; and one or more processors coupled to the wireless communication circuitry, wherein the one or more processors are configured to cause the UE to: establish communication with a base station: determine one or more beams to perform downlink communication from the base station; receive, from the base station, a transmission configuration indicator (TCI): determine downlink reference signals for performing beam failure detection based on the TCI: perform signal quality measurements for the one or more beams using the downlink reference signals, wherein said performing signal quality measurements comprise comparing a plurality of signal quality measurements to a threshold; and determine beam failure of at least one beam of the one or more beams based on said performing signal quality measurements.

Example 11. The UE of example 10, wherein the TCI is associated with a control resource set (CORESET), wherein the TCI indicates a plurality downlink reference signals, wherein said determining the downlink reference signals comprises selecting the downlink reference signals from the plurality downlink reference signals indicated in the TCI.

Example 12. The apparatus of example 10, wherein the TCI indicates a sounding reference signal (SRS), wherein said determining downlink reference signals based on the TCI is based on the SRS being indicating in the TCI.

Example 13. The apparatus of example 12, wherein determining the downlink reference signals based on the TCI comprises selecting the downlink reference signals used in a same bandwidth part.

Example 14. The UE of example 10, wherein said determining beam failure comprises, for n consecutive times: performing a respective signal quality measurement for a first beam; and comparing the respective signal quality measurement to a signal quality threshold: wherein beam failure is determined when the respective signal quality measurement falls below a signal quality threshold n consecutive times.

Example 15. The UE of example 10, wherein the downlink reference signals comprise synchronization signal block (SSB) or channel state information reference signal (CSI-RS).

Example 16. A non-transitory, computer accessible memory medium storing program instructions executable by one or more processors to cause a user equipment (UE) to: establish communication with a base station, wherein establishing communication with the base station includes determining one or more beams to perform communication with the base station: receive, from the base station, an implicit indication of downlink reference signals to use for beam failure detection: determine the downlink reference signals for performing beam failure detection based on the implicit indication: perform signal quality measurements for the one or more beams using the downlink reference signals, wherein said performing signal quality measurements comprise comparing a plurality of signal quality measurements to a threshold; and determine beam failure of at least one beam of the one or more beams based on said performing signal quality measurements.

Example 17. The non-transitory, computer accessible memory medium of example 16, wherein the implicit indication comprises a transmission configuration indicator (TCI).

Example 18. The non-transitory, computer accessible memory medium of example 17, wherein the TCI is associated with a control resource set (CORESET), wherein the TCI indicates a plurality of types of downlink reference signals, wherein said determining the type of downlink reference signals comprises selecting QCL-TypeD downlink reference signals from the plurality of types of downlink reference signals indicated in the TCI.

Example 19. The non-transitory, computer accessible memory medium of example 17, wherein the TCI indicates a sounding reference signal (SRS), wherein said determining the downlink reference signals based on the TCI is based on the SRS being indicating in the TCI.

Example 20. The non-transitory, computer accessible memory medium of example 16, wherein determining the downlink reference signals based on the implicit indication comprises selecting the downlink reference signals used for initial access.

Example 21. The non-transitory, computer accessible memory medium of example 16, wherein determining the downlink reference signals based on the implicit indication comprises selecting the downlink reference signals used for pathloss estimation.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

In some embodiments, a device includes: an antenna: a radio coupled to the antenna; and a processing element coupled to the radio. The device may be configured to implement any of the method embodiments described above.

In some embodiments, a memory medium may store program instructions that, when executed, cause a device to implement any of the method embodiments described above.

In some embodiments, an apparatus includes: at least one processor (e.g., in communication with a memory), that is configured to implement any of the method embodiments described above.

In some embodiments, a method includes any action or combination of actions as substantially described herein in the Detailed Description and claims.

In some embodiments, a method is performed as substantially described herein with reference to each or any combination of the Figures contained herein, with reference to each or any combination of paragraphs in the Detailed Description, with reference to each or any combination of Figures and/or Detailed Description, or with reference to each or any combination of the claims.

In some embodiments, a wireless device is configured to perform any action or combination of actions as substantially described herein in the Detailed Description, Figures, and/or claims.

In some embodiments, a wireless device includes any component or combination of components as described herein in the Detailed Description and/or Figures as included in a wireless device.

In some embodiments, a non-volatile computer-readable medium may store instructions that, when executed, cause the performance of any action or combination of actions as substantially described herein in the Detailed Description and/or Figures.

In some embodiments, an integrated circuit is configured to perform any action or combination of actions as substantially described herein in the Detailed Description and/or Figures.

In some embodiments, a mobile station is configured to perform any action or combination of actions as substantially described herein in the Detailed Description and/or Figures.

In some embodiments, a mobile station includes any component or combination of components as described herein in the Detailed Description and/or Figures as included in a mobile station.

In some embodiments, a mobile device is configured to perform any action or combination of actions as substantially described herein in the Detailed Description and/or Figures.

In some embodiments, a mobile device includes any component or combination of components as described herein in the Detailed Description and/or Figures as included in a mobile device.

In some embodiments, a network node is configured to perform any action or combination of actions as substantially described herein in the Detailed Description and/or Figures.

In some embodiments, a network node includes any component or combination of components as described herein in the Detailed Description and/or Figures as included in a mobile device.

In some embodiments, a base station is configured to perform any action or combination of actions as substantially described herein in the Detailed Description and/or Figures.

In some embodiments, a base station includes any component or combination of components as described herein in the Detailed Description and/or Figures as included in a mobile device.

In some embodiments, a 5G NR network node or base station is configured to perform any action or combination of actions as substantially described herein in the Detailed Description and/or Figures.

In some embodiments, a 5G NR network node or base station includes any component or combination of components as described herein in the Detailed Description and/or Figures as included in a mobile device.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Any of the methods described herein for operating a user equipment (UE) may be the basis of a corresponding method for operating a base station, by interpreting each message/signal X received by the UE in the downlink as message/signal X transmitted by the base station, and each message/signal Y transmitted in the uplink by the UE as a message/signal Y received by the base station Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor, comprising:
   memory storing instructions that, when executed, cause the processor to:
      determine one or more beams to perform downlink communication from a base station;
      receive, from the base station, a transmission configuration indicator (TCI) in an implicit indication, the TCI indicating:
         a sounding reference signal (SRS), and
         a first type of downlink reference signals based on the TCI;
      determine that the first type of downlink reference signals are used in a same bandwidth part (BWP) as a control resource set (CORESET);
      select the first type of downlink reference signals in order to perform beam failure detection and based at least in part on:
         a lowest resource identifier (ID) of the first type of downlink reference signals;
         the implicit indication;
         a pathloss estimation for the SRS;
         the determination that the first type of downlink reference signals are used in the same BWP as the CORESET; and
         the SRS and the first type of downlink reference signals being indicated in the TCI;
      perform signal quality measurements for the one or more beams using the first type of downlink reference signals; and
      determine beam failure of at least one beam of the one or more beams based on said performing signal quality measurements.

2. The processor of claim 1, wherein said determining beam failure is performed by comparing the signal quality measurements to a threshold.

3. The processor of claim 1, wherein said determining beam failure comprises, for n consecutive times:
   performing a respective signal quality measurement for a first beam; and
   comparing the respective signal quality measurement to a signal quality threshold;
   wherein beam failure is determined when the respective signal quality measurement falls below a signal quality threshold n consecutive times.

4. The processor of claim 1, wherein the first type of downlink reference signals comprise synchronization signal block (SSB) or channel state information reference signal (CSI-RS).

5. The processor of claim 1, wherein the TCI is associated with a control resource set (CORESET), wherein the TCI indicates a plurality of types of downlink reference signals, wherein said selecting the type of downlink reference signals comprises selecting the first type of downlink reference signals from the plurality of types of downlink reference signals indicated in the TCI.

6. A method, comprising:
   determining one or more beams to perform downlink communication from a base station;
   receiving, from the base station, a transmission configuration indicator (TCI) in an implicit indication, the TCI indicating:
      a sounding reference signal (SRS), and
      a first type of downlink reference signals based on the TCI;
   determining that the first type of downlink reference signals are used in a same bandwidth part (BWP) as a control resource set (CORESET);
   selecting the first type of downlink reference signals in order to perform beam failure detection and based at least in part on:
      a lowest resource identifier (ID) of the first type of downlink reference signals;
      the implicit indication;
      a pathloss estimation for the SRS;
      the determination that the first type of downlink reference signals are used in the same BWP as the CORESET; and
      the SRS and the first type of downlink reference signals being indicated in the TCI;
   determining based at least in part on the SRS being indicated in the TCI, the first type of downlink reference signals for performing beam failure detection;
   performing signal quality measurements for the one or more beams using the first type of downlink reference signals; and
   determining beam failure of at least one beam of the one or more beams based on said performing signal quality measurements.

7. The method of claim 6, wherein the TCI is associated with a control resource set (CORESET), wherein the TCI indicates a plurality downlink reference signals, wherein said selecting the downlink reference signals comprises selecting the first type of downlink reference signals from the plurality downlink reference signals indicated in the TCI.

8. The method of claim 6, wherein said determining beam failure comprises, for n consecutive times:
   performing a respective signal quality measurement for a first beam; and
   comparing the respective signal quality measurement to a signal quality threshold;
   wherein beam failure is determined when the respective signal quality measurement falls below a signal quality threshold n consecutive times.

9. The method of claim 6, wherein the first type of downlink reference signals comprise synchronization signal block (SSB) or channel state information reference signal (CSI-RS).

10. A non-transitory computer readable storage medium storing program instructions executable by one or more processors, which when executed, cause the one or more processors to:
   determining one or more beams to perform communication with a base station;
   receive, from the base station, a transmission configuration indicator (TCI) in an implicit indication, the TCI indicating:
      a sounding reference signal (SRS), and a first type of downlink reference signals based on the TCI;
determine that the first type of downlink reference signals are used in a same bandwidth part (BWP) as a control resource set (CORESET);
select the first type of downlink reference signals in order to perform beam failure detection and based at least in part on:
- a lowest resource identifier (ID) of the first type of downlink reference signals;
- the implicit indication;
- a pathloss estimation for the SRS;
- the determination that the first type of downlink reference signals are used in the same BWP as the CORESET; and
- the SRS and the first type of downlink reference signals being indicated in the TCI;

perform signal quality measurements for the one or more beams using the first type of downlink reference signals; and
determine beam failure of at least one beam of the one or more beams based on said performing signal quality measurements.

11. The non-transitory computer readable storage medium of claim 10, wherein the TCI is associated with a control resource set (CORESET), wherein the TCI indicates a plurality of types of downlink reference signals, wherein said selecting the type of downlink reference signals comprises selecting QCL-TypeD downlink reference signals from the plurality of types of downlink reference signals indicated in the TCI.

12. The non-transitory computer readable storage medium of claim 10, wherein selecting the first type of downlink reference signals is based on the implicit indication and comprises selecting the first type of downlink reference signals used for initial access.

13. The non-transitory computer readable storage medium of claim 10, wherein said determining beam failure comprises comparing a plurality of signal quality measurements to a threshold.

14. The non-transitory computer readable storage medium of claim 10, wherein the first type of downlink reference signals comprise synchronization signal block (SSB) or channel state information reference signal (CSI-RS).

15. The non-transitory computer readable storage medium of claim 10, wherein said determining beam failure comprises, for n consecutive times:
performing a respective signal quality measurement for a first beam; and
comparing the respective signal quality measurement to a signal quality threshold;
wherein beam failure is determined when the respective signal quality measurement falls below a signal quality threshold n consecutive times.

16. The non-transitory computer readable storage medium of claim 10, wherein said performing signal quality measurements comprises measuring at least one of:
a block error rate (BLER);
a signal to interference plus noise ratio (SINR);
a signal to noise ratio (SNR);
a received signal strength indicator (RSSI);
a reference signal received power (RSRP); or
a reference signal received quality (RSRQ).

17. The non-transitory computer readable storage medium of claim 10, wherein the TCI is associated with a control resource set (CORESET), wherein the TCI indicates a plurality of types of downlink reference signals, wherein said selecting the type of downlink reference signals comprises selecting the first type of downlink reference signals from the plurality of types of downlink reference signals indicated in the TCI.

18. The non-transitory computer readable storage medium of claim 10, wherein at least one of the one or more processors is a baseband processor.

* * * * *